(12) United States Patent
Strenk

(10) Patent No.: US 6,755,522 B1
(45) Date of Patent: Jun. 29, 2004

(54) EYEGLASS AND AUXILIARY FRAME ASSEMBLY

(76) Inventor: Scott K. Strenk, 828 E. Loredo St., Chandler, AZ (US) 85225

( * ) Notice: Subject to any disclaimer, the term of this patent is extended or adjusted under 35 U.S.C. 154(b) by 0 days.

(21) Appl. No.: 10/317,412

(22) Filed: Dec. 12, 2002

(51) Int. Cl.[7] ................................. G02C 7/08
(52) U.S. Cl. ........................... 351/57; 351/47
(58) Field of Search ..................... 351/47, 57

(56) References Cited

U.S. PATENT DOCUMENTS

| | | | | |
|---|---|---|---|---|
| 5,416,537 A | 5/1995 | Sadler | ............ | 351/57 |
| 5,642,177 A | 6/1997 | Nishioka | ............ | 351/47 |
| 5,975,691 A | 11/1999 | Ku | ............ | 351/47 |
| 6,120,144 A | 9/2000 | Park | ............ | 351/47 |
| 6,139,141 A | 10/2000 | Zider | ............ | 351/57 |
| 6,170,948 B1 | 1/2001 | Chao | ............ | 351/47 |
| 6,231,179 B1 | 5/2001 | Lee | ............ | 351/47 |
| 6,290,353 B1 * | 9/2001 | Chou | ............ | 351/47 |
| 6,354,703 B1 | 3/2002 | Sadler | ............ | 351/57 |
| 6,412,941 B1 | 7/2002 | Xiao | ............ | 351/47 |
| 6,412,942 B1 | 7/2002 | McKenna et al. | ............ | 351/47 |
| 2002/0047984 A1 * | 4/2002 | Tang | ............ | 351/57 |
| 2002/0131012 A1 | 9/2002 | Tsai | ............ | 351/57 |

FOREIGN PATENT DOCUMENTS

| | | |
|---|---|---|
| EP | 1241512 | 9/2002 |
| WO | 9716761 | 5/1997 |

* cited by examiner

*Primary Examiner*—Huy Mai
(74) *Attorney, Agent, or Firm*—Lieberman & Brandsdorfer, LLC

(57) ABSTRACT

A design to mount a clip to an eyeglass frame. In a first embodiment, the clip has a set of magnets mounted on an extension adjacent to the perimeter of the frame lenses. The frame has a set of magnets mounted on an interior side of the elbows. An exterior surface of the clip is adapted to be placed adjacent to an interior surface of the lenses of the frame with the magnets of the clip attracting to the magnets of the frame. In a second embodiment, the frame includes a set of mounting elements on an exterior surface of the lenses. The clip has a set of female receiving elements. The mounting elements and/or the female receiving elements may include magnets. An interior surface of the clip is adapted to be placed adjacent to an exterior surface of the frame, with the extensions and receiving elements being magnetically attracted.

11 Claims, 9 Drawing Sheets

EYEGLASS AND AUXILIARY FRAME ASSEMBLY

BACKGROUND OF THE INVENTION

1. Technical Field

This invention relates to an eyeglass frame and an auxiliary lens adapted to be mounted to the frame. More specifically, the invention relates to a force that enables the frame and auxiliary lens to mount.

2. Description of the Prior Art

Auxiliary lenses for eyeglass frames are commonly know in the art as clips for use in bright light environments, such as in the sunlight. Due to sensitivity to bright lights, users of eyeglasses prefer to use clips to attach to their frames rather than switching between different glasses for different lighting environments. It is also known in the art to use clasps and other conventional mechanical affixing elements to mount the clips to the frame of the eyeglasses.

However, there are problems associated with conventional mechanical affixing elements.

For example, they commonly result in relatively cumbersome frames which are usually aesthetically unpleasing to see or be seen wearing. An additional limitation with the mechanical affixing elements it the misalignment between the frame and the clip, and difficulties associated with affixing the clips to the eyeglasses as well as detaching the clips from the eyeglasses. Accordingly, clips for eyeglasses are desirable, however mechanical affixing elements are not a desirable means for attaching the clip to the eyeglass frame. In recent years there have been developments in alternative elements for attaching clips to eyeglass frames using magnets. The use of magnets has several advantages over that of the conventional mechanical attaching elements. Since the magnets are mounted to both the clip and the eyeglass frame, misalignment is not as common as with conventional mechanical affixing elements. U.S. Patent Publication 2002/0131012 A1 to Tsai discloses several embodiments of eyeglass frames and associated clips that are magnetically mounted to the frame. In one embodiment, a rimless eyeglass frame is shown with a rimless clip. The magnet on the eyeglass frame is placed on an exterior side of the lens as an extension of the elbow. The magnet is flush with the elbow so as not to function as an extension or a male receiving means. Similarly, the clip has a magnet mounted on an interior side of the lens. The magnet of the clip is attracted to the magnet of the eyeglass frame. The clip is mounted on exterior side of the eyeglass frame. However, one of the limitations associate with Tsai is that the magnets do not include a male/female connecting element in conjunction with the magnetic attraction. If the magnets should become misaligned or if the magnet weakens in some manner, a male/female connection element would enhance the functionality and mounting of the clip to the eyeglasses. Accordingly, the Tsai publication is one example of an externally mounted clip with a magnetic attaching element.

U.S. Pat. No. 5,975,691 to Ku discloses another formative of an eyeglass frame with a clip accessory, wherein the clip is magnetically mounted to the frame. The clip includes an extension parallel to the cross bar, and a magnet mounted to the extension. Similarly, the elbow of the eyeglass frame includes an opening with a magnet placed therein. The clip is shown placed over the exterior side of the lens of the eyeglasses, with the magnetic attraction of the clip magnet and eyeglass frame magnet holding the clip in place. However, placement of the clip on the exterior side of the eyeglass frame provides an element which may enable misalignment of the clip as well as an unpleasing look to the eyeglasses. If the magnetic attaching element should fail for any reason, the clip would become detached from the frame and fall. Accordingly, placement of the clip on the outside of the eyeglass frame can be less desirable.

By placing the clip between the user and the interior side of the lens, the clip is less likely to fall off of the frame if the attraction of the magnets should fail. Similarly, by providing an added embodiment for attaching an externally mounted clip to the frame, the clip is also less likely to fall off the frame should the magnets fail. Accordingly, there is a need for an improved magnetic mounting structure for placing an eyeglass clip in communication with an eyeglass frame.

SUMMARY OF THE INVENTION

This invention comprises an eyeglass frame and auxiliary lenses adapted to be magnetically mounted to the frame.

In a first aspect of the invention, a pair of eyeglasses with a first lens and a second lens is provided. Each of the lenses has a rim that extends around a perimeter thereof. A cross bar is mounted between the perimeters of the lenses. An elbow is mounted to an exterior side of the rims. The elbow has a leg mounted perpendicular to the elbow. A portion of the elbow adjacent to the interior side of the lens and parallel to the cross bar includes an aperture adapted to receive a magnet. A pair of auxiliary eyeglasses is also provided. The auxiliary glasses have a first lens and a second lens. Each of the lenses includes a rim extending around a perimeter thereof. A cross bar is mounted between the lenses and holds the lenses in a spaced apart relationship. An extension is provided adjacent to the lens perimeter and parallel to the cross bar. The extension includes an aperture adapted to extend from a front side of the extension to a back side of the extension, with a magnet mounted in the aperture. The magnet of the eyeglasses is adapted to bond to a magnet mounted in the aperture of the auxiliary eyeglasses thereby placing the interior side of the lens of the auxiliary eyeglasses adjacent to a user of the eyeglasses. The interior side of the eyeglass lens preferably receives an adjacently mounted exterior side of the auxiliary lens. The magnets of the eyeglasses and the magnets of the auxiliary eyeglasses are preferably oppositely polarized. The cross bar of the eyeglasses may include an extension perpendicular to the cross bar so that the cross bar of the auxiliary lens may contact the extension when the auxiliary lens is mounted to the eyeglasses.

In a second aspect of the invention, a pair of eyeglasses with a first lens and a second lens is provided. Each lens has an interior side and an exterior side. The interior side of the lens is adapted to be placed adjacent to a user of the eyeglasses. A cross bar is mounted between the lenses. A cross bar mounting means is adapted to extend from the exterior side of the lens to the interior side of the lens. An elbow is mounted to the lenses parallel to the cross bar. A proximal end of the elbow is adapted to mount through the lens. A leg is mounted perpendicular to the elbow. The proximal end of the elbow includes a mounting element in the form of a polarized magnet. A pair of auxiliary lenses is provided with each lens having an interior side and an exterior side. The interior side of the lens is adapted to be placed adjacent to the exterior side of the lens of the eyeglasses. A cross bar is mounted between the perimeters of the lenses. A receiving means is adapted to be mounted adjacent to an interior side of the lens. The receiving means has a female receiving end which is adapted to receive the mounting element of the eyeglasses. The female receiving means of the auxiliary lenses is magnetically attracted to the magnet of the eyeglasses. The cross bar of the eyeglasses may include a mounting element adjacent to each mount thereof. The mounting element preferably includes a mounted magnet. A female receiving means may be provided adjacent to each mount of the cross bar of the auxiliary lenses. The cross bar female receiving means of the auxiliary lenses is preferably adapted to bond to the mounting element adjacent to the eyeglass cross bar.

In a third aspect of the invention, a pair of eyeglasses with a first lens and a second lens is provided. Each of the lenses has a rim that extends around a perimeter thereof. A cross bar is mounted between the perimeters of the lenses. An elbow is mounted to an exterior side of the rims. The elbow has a leg mounted perpendicular to the elbow. A first magnetic attracting element is mounted on an interior side of the eyeglasses. A pair of auxiliary glasses have a first lens and a second lens. Each of the lenses includes a rim extending around a perimeter thereof. A cross bar is mounted between the lenses and holds the lenses in a spaced apart relationship. A second magnetic attracting element is mounted to an exterior side of the auxiliary eyeglasses. The first magnetic attracting element of the eyeglasses is adapted to bond to the second magnetic attracting element of the auxiliary eyeglasses, such that the exterior side of the auxiliary eyeglasses is placed adjacent to an interior side of the eyeglasses. The first and second magnetic attracting element may include a magnet, a magnetic material, and a metallic magnetic attracting element. The first and second magnetic attracting elements are preferably oppositely polarized. The first magnetic attracting element may be placed adjacent to an interior side of said elbow, and the second magnetic attracting element may be adjacent to the rim of the auxiliary eyeglasses.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Use of eyeglass clips in the form of sunshades as an accessory to eyeglass frames has become very popular in that it provides a robust use of the frames without the need for an additional set of eyeglass frames having a permanently shaded lens. Magnetic attaching elements for attaching a clip to the frame mitigates misalignment of the clip to the frame. The structure of the mounting of the magnets or magnetic material on the clip and/or frame is specifically designed to mitigate loss of the clips in the event of a failure of the magnetic mounting elements.

Technical Details

Figure 1:
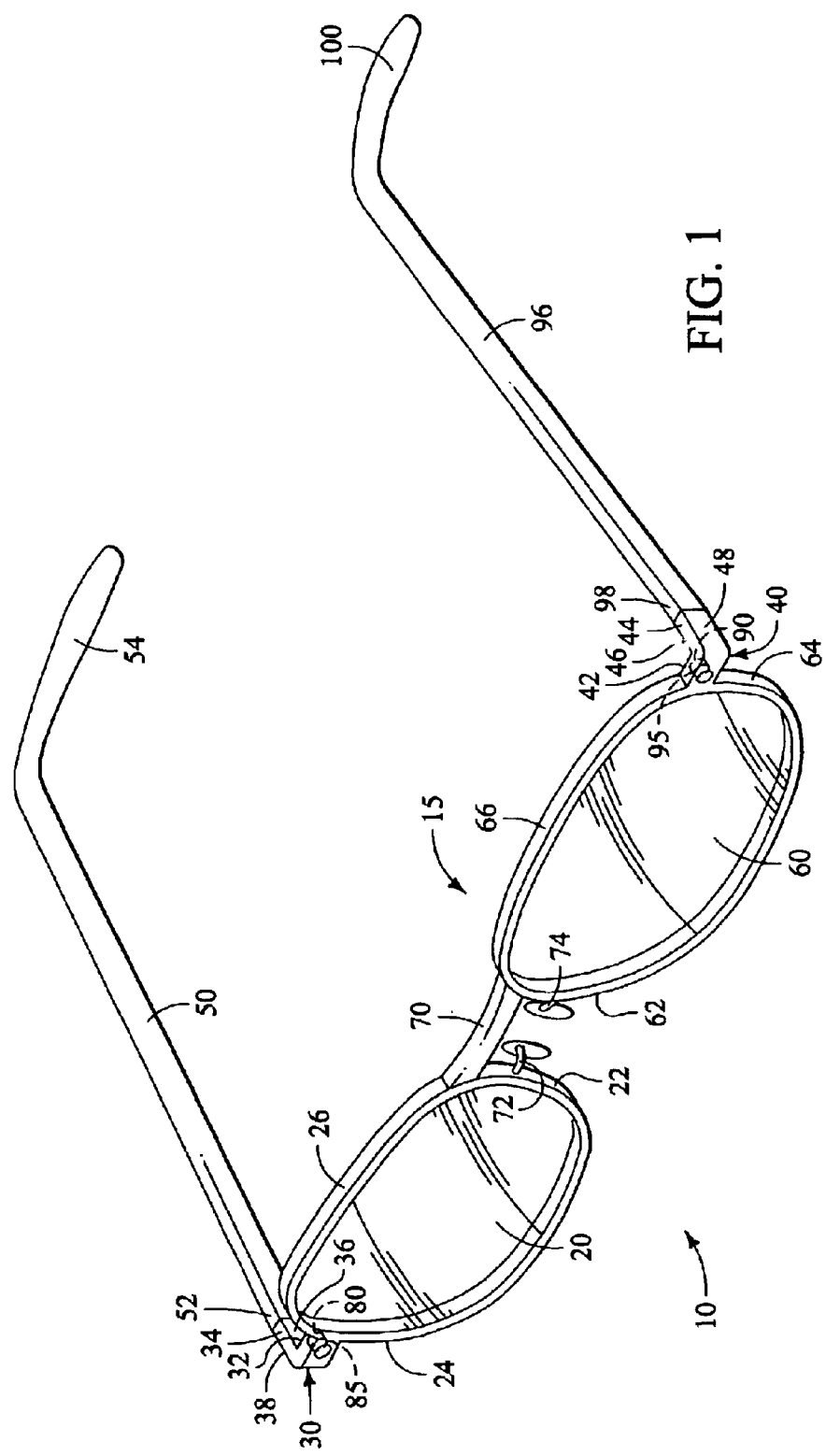
FIG. 1 is a perspective view of an eyeglass frame according the first embodiment of this invention.

FIG. 1 is a perspective view of an eyeglass frame 10 according to the first embodiment of the invention. As shown, the eyeglass frame 10 is a standard frame with a first lens 20 and a second lens 60. Both the first lens 20 and the second lens 60 have a rim 26 and 66, respectively, mounted along the perimeter of each lens. In addition, the first lens 20 has an interior side 22 and an exterior side 24, and the second lens 60 has an interior side 62 and an exterior side 64. The frame includes a cross bar 70 mounted between the first and second lens 20 and 60, respectively, to hold the lenses in a spaced apart relationship. On the interior side of the frame 15, two extensions 72 and 74 are provided perpendicular to the cross bar. Each of the extensions 72 and 74 is adapted to receive a nose guard. In relation to the shape of the lens with respect to the position of the cross bar 70, a diametrically or near diametrically, opposite edge of each lens 20 and 60, has an elbow 30 and 40, respectively. Each of the elbows 30 and 40 functions as a joint between the respective lens and an associated longitudinal leg 50 and 96, respectively. The longitudinal legs 50 and 96 are mounted perpendicular, or near perpendicular, to the plane of the lenses 20 and 60. Each of the longitudinal legs 50 and 96 include a proximal end 52, 98 and a distal end 54, 100, respectively. The proximal end of the legs 52 and 98 are mounted to a distal end of the respective elbow 34, 44. During use, the legs 50 and 96 are placed in a parallel relationship, with the distal ends 54, 100 of the longitudinal legs 50, 96 being adapted to be placed in communication with the outside of the ear of the user.

Each elbow 30 and 40 has an interior side 36, 46 and an exterior side 38, 48, respectively. The interior side of the proximal ends 32,42 of the elbows 30, 40 is parallel to the interior side of the lenses 22, 62, and the exterior side of the proximal ends 32, 42 of the elbows 30, 40 is parallel to the exterior side of the lenses 24, 64. The interior side of the proximal end 32, 42 of each of the elbows has an opening 80, 90, respectively. The openings 80, 90 are adapted to receive a magnet 85, 95 therein, or a material with magnetic properties. The opening may extend through from the interior side 36, 46 of the elbow to the exterior side 38, 48 of the elbow, or the exterior side 38, 48 of the elbow may include an ornamental covering. Accordingly, the magnet 85, 95 is held in an aperture on the interior side of the eyeglass frame adjacent to a proximal end of each of the elbows.

Figure 2:
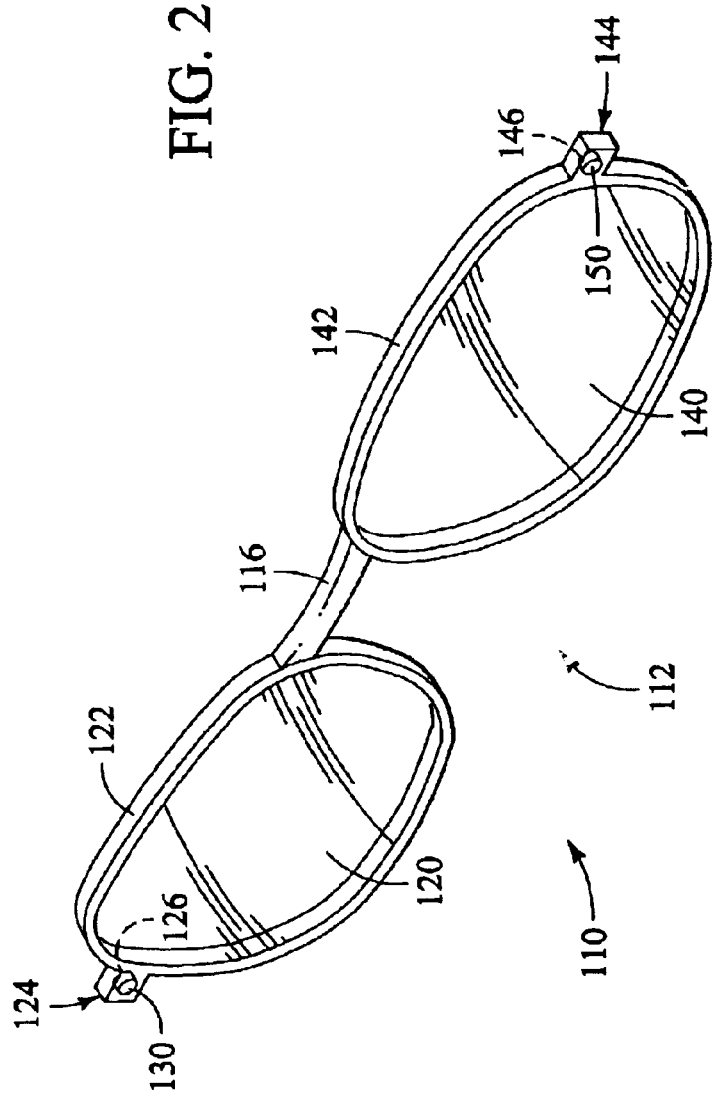
FIG. 2 is a perspective view of an auxiliary clip according to the first embodiment of this invention.

FIG. 2 is a perspective view of an auxiliary clip 110 for an eyeglass frame according to the preferred embodiment of the invention. As shown, the auxiliary clip 110 has a standard clip frame with a first lens 120 and a second lens 140. Both the first lens 120 and the second lens 140 have a rim 122 and 142, respectively, mounted along the perimeter of each lens. The clip 110 includes a cross bar 116 mounted between the first lens 120 and the second lens 140 to hold the lenses in a spaced apart relationship. In relation to the shape of the lens with respect to the position of the cross bar 116, a diametrically or near diametrically, opposite edge of each lens 120 and 140, has an extension 124 and 144, respectively. Each extension 124 and 144 has an aperture 126 and 146, respectively. The aperture 126, 146 is adapted to receive and hold a magnet 130, 150, respectively, therein. Each magnet of the clip has a polarity that is opposite to the polarity of the magnets 85 and 95 of the eyeglass frame 10.

Figure 3:
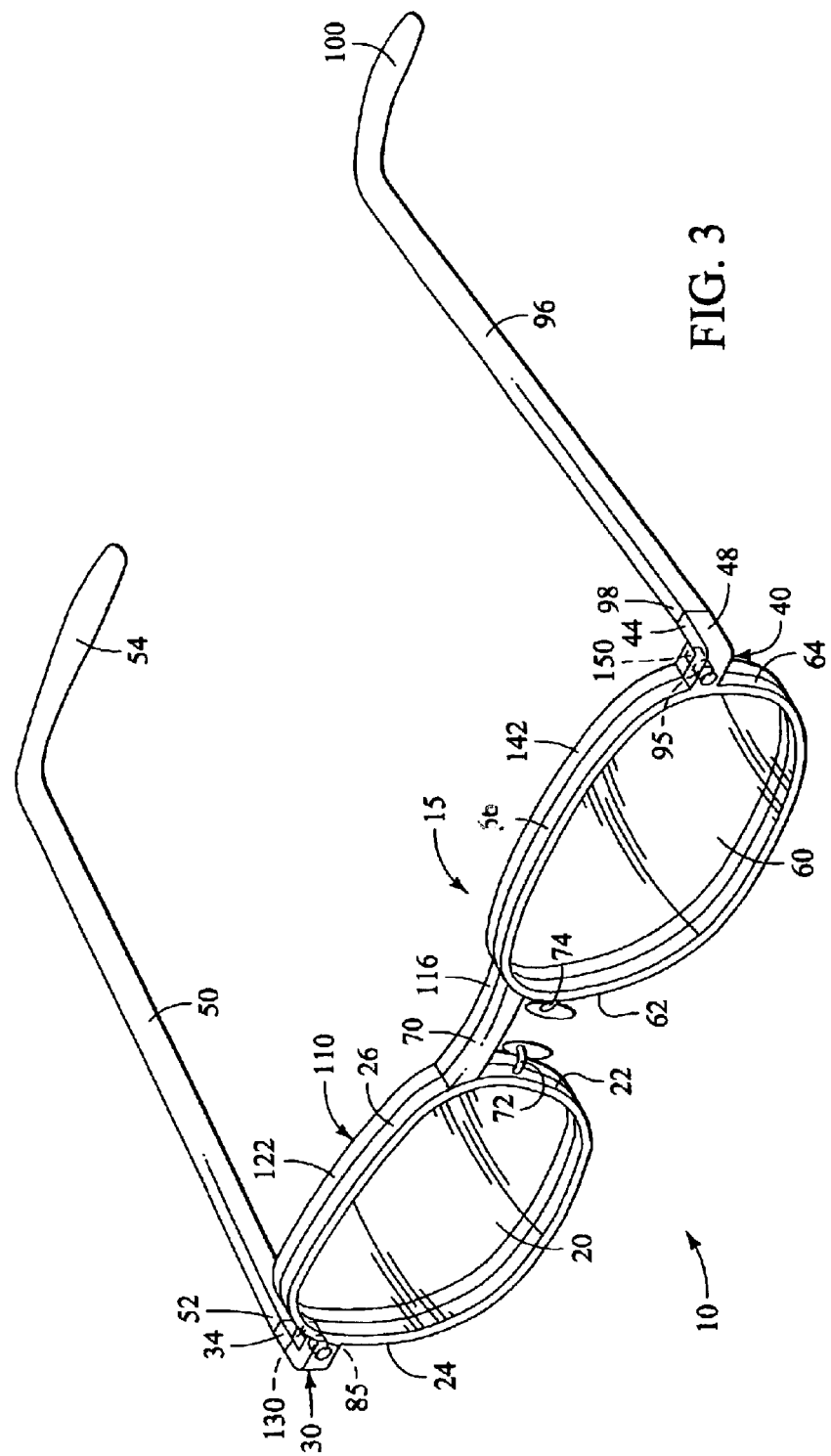
FIG. 3 is an illustration of the auxiliary clip attached to the frame according to the first embodiment of the invention, and is suggested for printing on the first page of the issued patent.

To secure the clip 10 to the eyeglass frame 110, the user must place an exterior side of the clip 112 adjacent to the interior side of the lenses 22 and 62 of the frame 10. The cross bar 116 of the clip 110 fits behind the cross bar 70 of the frame 10. The side of the lenses 120 and 140 of the clip 110 adjacent to the cross bar 116 make contact with the extensions 72 and 74 of the frame 10 when the clip is properly secured to the frame. FIG. 3 is an illustration of the clip 110 attached to the frame 10. The magnets 130, 150 of the clip 110 are attracted to the magnets 85, 95 of the frame 10. When the clip is properly placed with respect to the frame such that the exterior side of the clip 112 is placed adjacent to the interior side 15 of the frame lenses, the first magnet 85 of the frame 10.bonds to the first magnet 130 of the clip 110 and the second magnet 95 of the frame 10 bonds to the second magnet 150 of the clip 110. Accordingly, the attraction of the magnets of the clip to the magnets of the frame, together with the placement of the exterior side of the clip adjacent to the interior side of the lens of the frame, ensures the mechanical stability of the clip as well as proper alignment of the clip to the frame.

Figure 4:
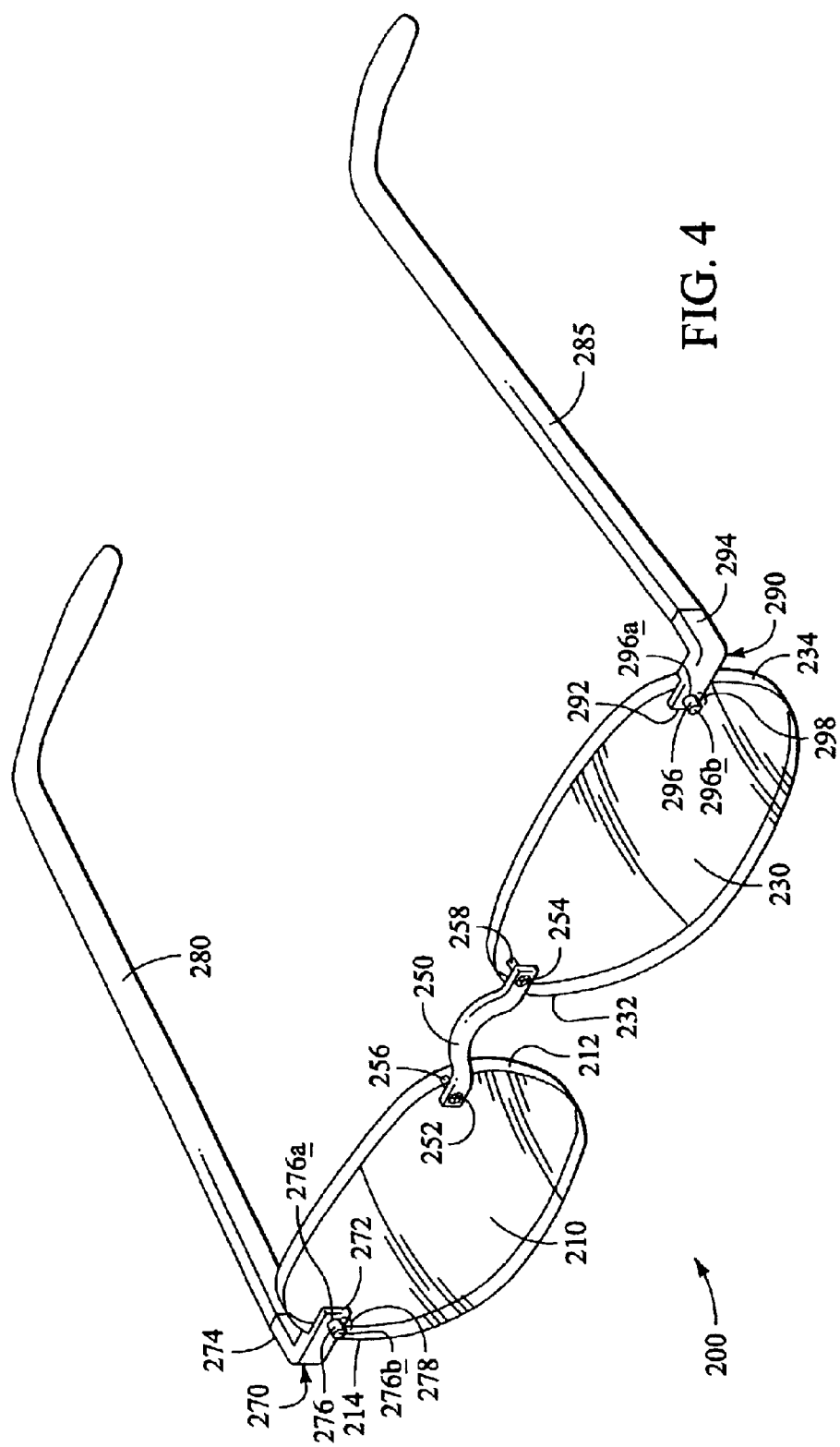
FIG. 4 is perspective view of an eyeglass frame according to the second embodiment of the invention.

FIG. 4 is a perspective view of a second embodiment of an eyeglass frame 200 adapted to receive a magnetically mounted auxiliary clip 300. As shown, the eyeglass frame 200 is a standard rimless frame with a first lens 210 and a second lens 230. The frame 200 includes a cross bar 250 mounted between the first and second lenses 210 and 230, respectively, to hold the lenses in a spaced apart relationship. The cross bar 250 has a post 252 and 254 on opposite ends of the bar. Each post 252 and 254 is adapted to mount through the respective lens to hold the lenses in a spaced apart relationship. On a diametrically, or near diametrically, opposite side of the perimeter of each lens 210 and 230 from the cross bar 250 is an elbow 270 and 290. The elbows 270 and 290 each have a proximal end 272, 292 and a distal end 274, 294. The proximal end 272, 292 of each elbow 270, 290 has a mounting element 276, 296 that is placed through the adjacent lens 210, 230 from an exterior side 214, 234 of the lenses to an interior side 212, 232 of the lenses. This enables each elbow 270, 290 to mount to the lenses without the need for a rim around the perimeter of the lenses. The distal end 274, 294 of each elbow 270, 290 has a longitudinal leg 280, 285 that extends therefrom.

The mounting elements 276, 296 each have a proximal end 276a, 296a and a distal end 276b, 296b. The proximal end 276a, 296a of the extension is flush with the exterior side of the proximal end 272, 292 of the elbows 270, 290. The mounting elements 276, 296 each have an extension 278, 298 from the proximal ends 276a, 296a to the distal ends 276b, 296b. The length of the extensions 278, 298 range from about 0.5 mm to about 2 mm in length. In addition, the extension includes a magnet, which may be in the form of a magnetic material along the exterior surface of the extension, magnetic material within an interior section of the extension, a magnet within an interior section of the extension, or any form which enables the magnetic properties of the extension to attract oppositely polarized materials. Accordingly, the elbows 270 and 290 of the frame 200 may include extensions 278, 298, respectively, with magnets or magnetic material therein.

Figure 5:
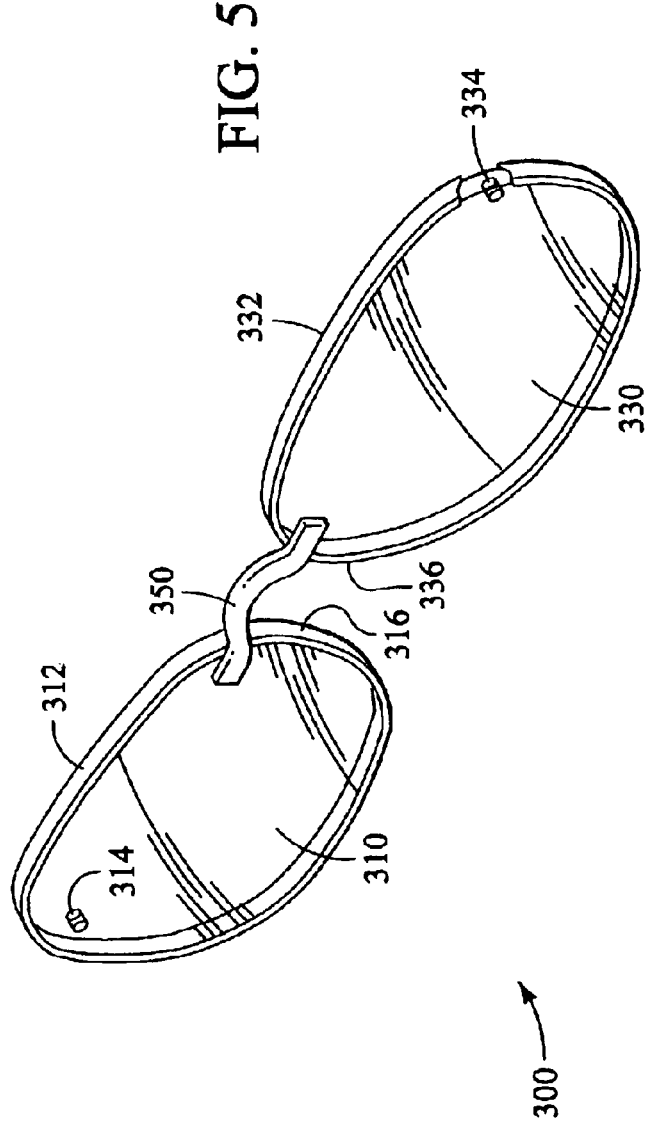
FIG. 5 is a perspective view of an auxiliary clip according to the second embodiment of the invention.
Figure 6:
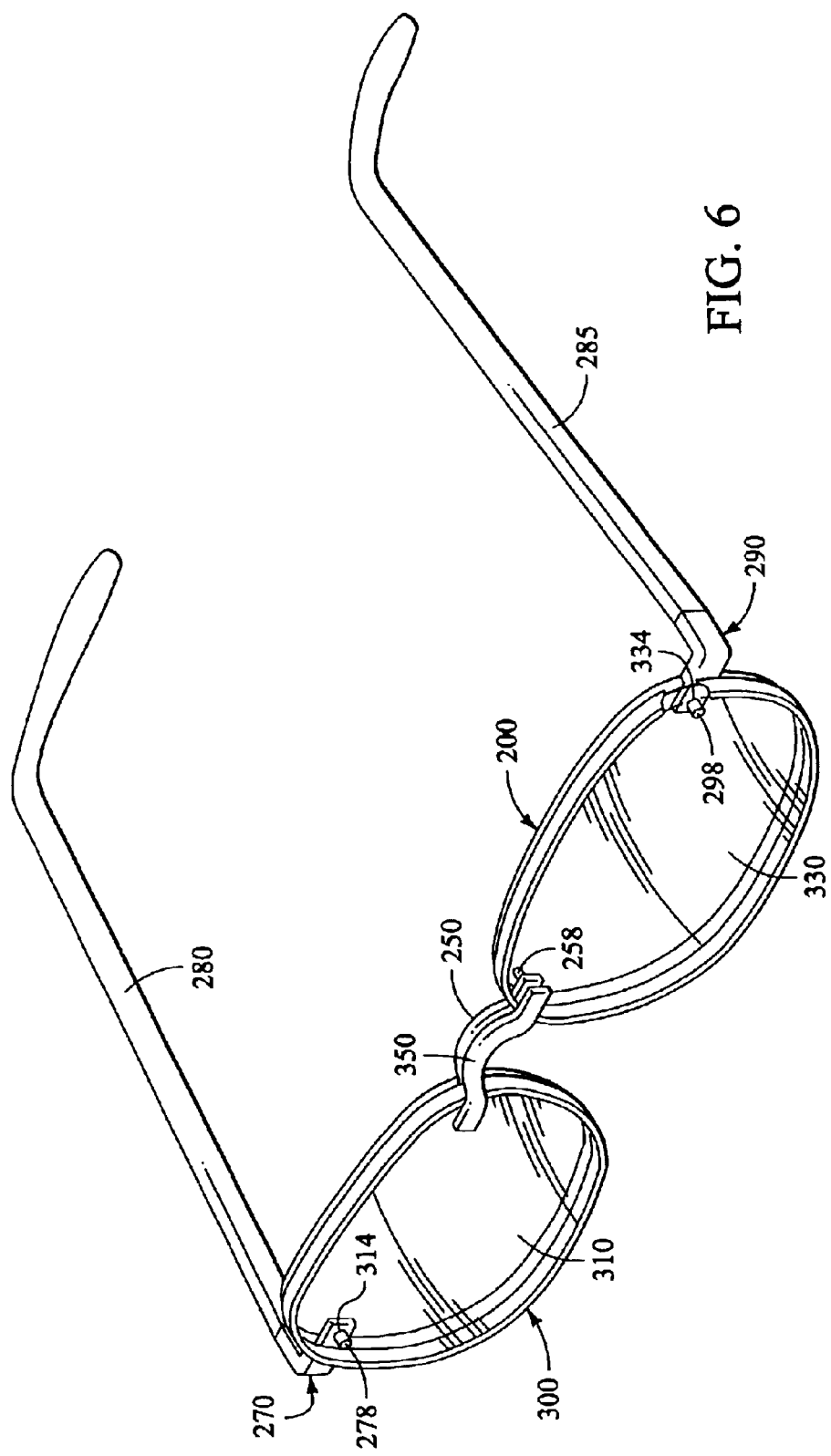
FIG. 6 is an illustration of the auxiliary clip bonding to the eyeglass frame according to the second embodiment of the invention.

FIG. 5 is a perspective view of an auxiliary clip 300 adapted to fit onto the eyeglass frames 200 as shown in FIG. 4 according to a second embodiment of the invention. As shown, the auxiliary clip 300 has a standard clip frame with a first lens 310 and a second lens 330. Both the first lens 310 and the second lens 330 are shown with a rim 312 and 332, respectively, mounted along the perimeter of each lens. The clip 300 includes a cross bar 350 mounted between the first lens 310 and the second lens 330 to hold the lenses in a spaced apart relationship. In relation to the placement of the extensions 278, 298 of the frame 200, the clip 300 includes female receiving ends 314 and 334 adjacent to an interior side 316, 336 of the lenses. The female receiving ends 314 and 334 are mounted on the clip 300 and positioned to bond to the extensions 278 and 298 of the frame. The female receiving ends 314 and 334 may include a magnet or magnetic material with a polarity that is the opposite of the polarity of the extensions 278 and 298 of the frame. Alternatively, the female receiving ends 314 and 334 may be comprised of a metallic material that attracts and bonds to the extensions 278, 298. When the clip 300 is mounted to the frame, the physical shape of the extensions 278 and 298 of the frame, and the associated receiving ends 314 and 334 of the clip, enhance the bonding and alignment of the clips to the frame. FIG. 6 is an illustration showing the placement and bonding of the clip 300 to the frame 200. As shown in FIG. 6 the female receiving end 314 receives the extension 278 and the female receiving end 334 receives the extension 298. The magnetic attraction of the extensions and the female receiving ends enhance the bonding of the clip to the frame. Accordingly, the clip is mounted to an exterior side of the frame through a magnetic component as well as a mechanical component.

Figure 7:
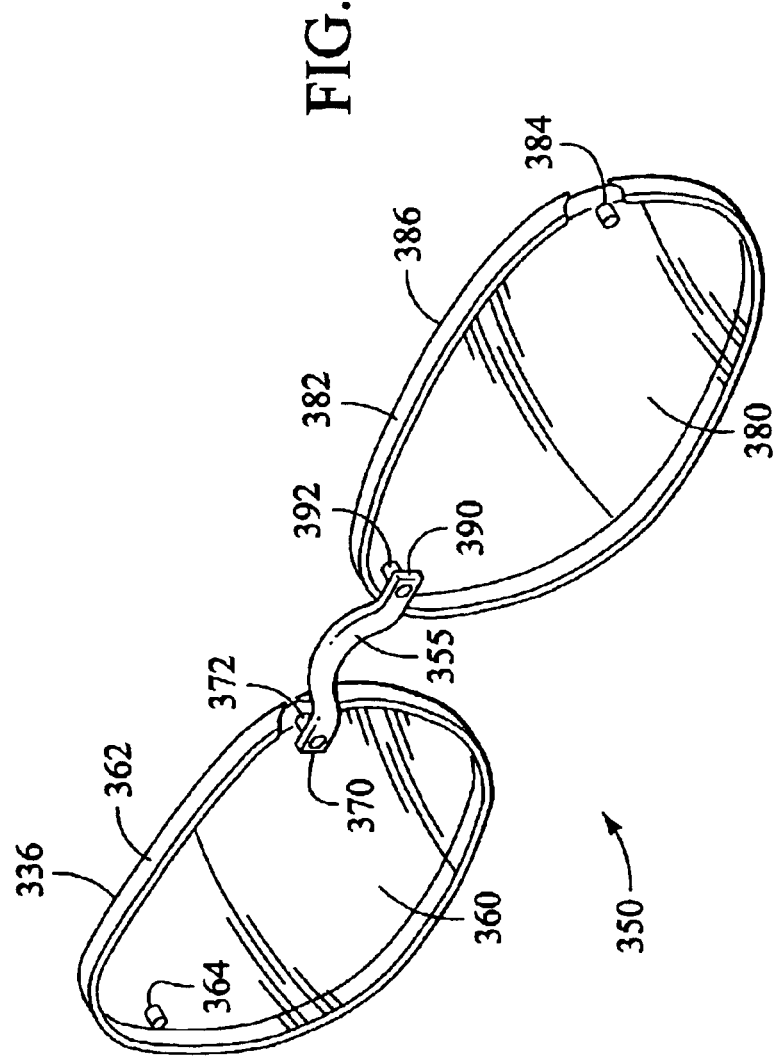
FIG. 7 is an illustration of an alternative configuration of the frame of the second embodiment of the invention.

In a further embodiment, the clip of FIG. 5 may be modified with other components. FIG. 7 is an illustration of an alternative configuration of the clip 300 that is adapted to be mounted to the frame 200. The clip 350 has a standard clip frame with a first lens 360 and a second lens 380. Both the first lens 360 and the second lens 380 are shown with a rim 362 and 382, respectively, mounted along the perimeter of each lens. The clip 350 includes a cross bar 355 mounted between the first lens 360 and the second lens 380 to hold the lenses in a spaced apart relationship. In relation to the extensions 278, 298 of the frame 200, the clip 350 includes female receiving ends 364 and 384 adjacent to an interior side 336, 386 of the lenses 360, 380. The female receiving ends 364, 384 are mounted on the clip 350 and positioned to bond to the extensions 276 and 296 of the frame. The female receiving ends 364 and 384 may include a magnet with a polarity that is the opposite of the polarity of the extensions 278 and 298 of the frame 200. In addition, the cross bar 355 includes a first end 370 and a second end 390. The first end 370 is attached to the first lens 360 and the second end 390 is attached to the second lens 380. The first end 370 of the cross bar 355 has a female receiving end 372 perpendicular to the plane of the cross bar 355. Similarly, the second end 390 of the cross bar 355 has a female receiving end 392 perpendicular to the plane of the cross bar 355. Accordingly, the clip 350 is a modification of the clip 300 to include a set of additional female receiving ends adjacent to the ends of the cross bar.

Figure 8:
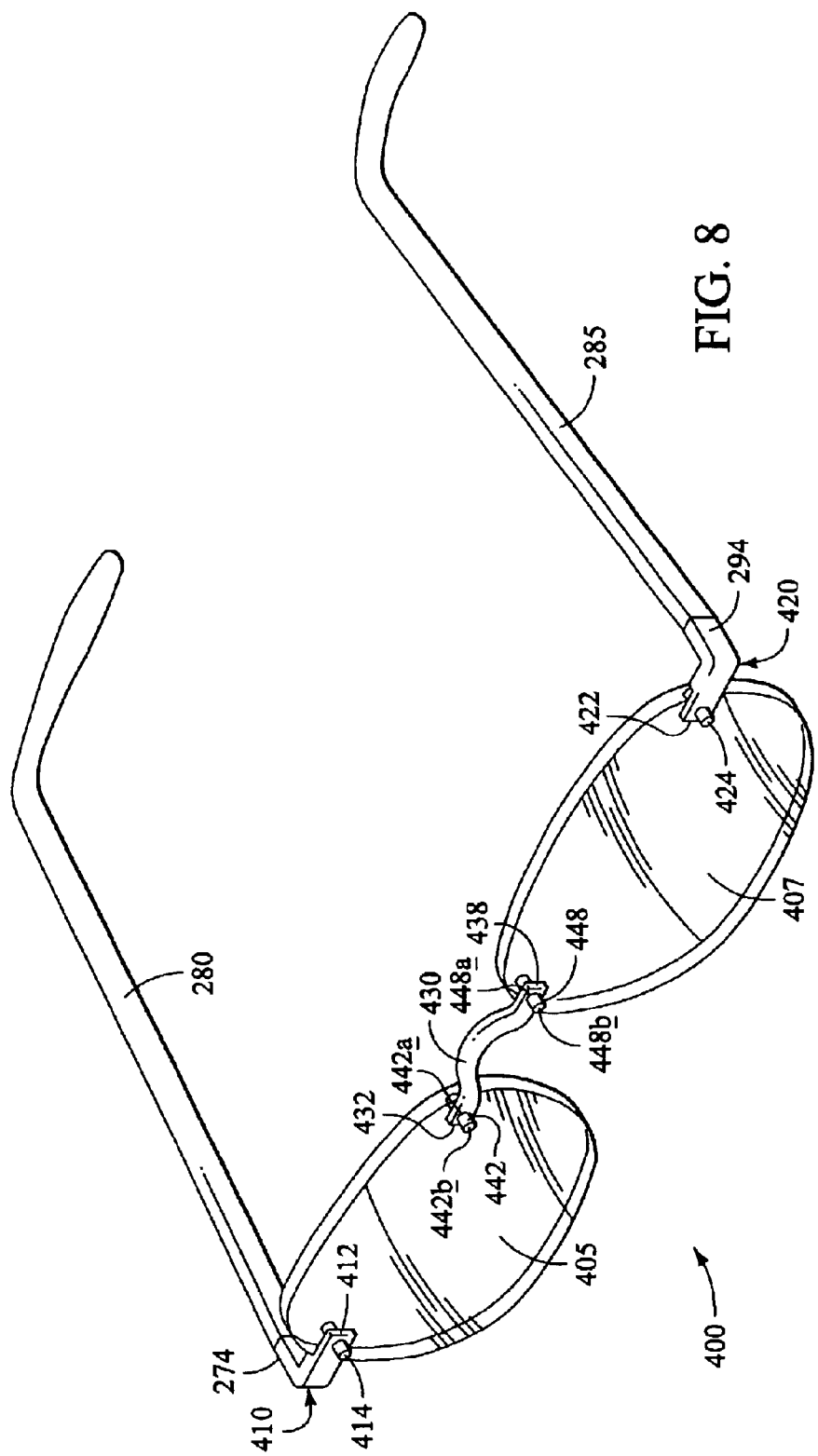
FIG. 8 is an illustration of an alternative configuration of the clip of the second embodiment of the invention.

FIG. 8 is an illustration of an alternative configuration of the frame 200 that is adapted to receive the clip 350, as shown in FIG. 7. The frame 400 is similar to the frame 200 of FIG. 5. The frame 400 is a rimless frame with extensions 414, 424 adjacent to the proximal ends 412, 422 of the elbows 410, 420. The extensions 414, 424 are equivalent to the extensions 278, 298 associated with the frame 200 of FIG. 4. The frame also includes a cross bar 430 to held the first lens 405 and the second lens 407 in a spaced relationship. The cross bar 430 of the frame 400 includes a first end 432 and a second end 438. The first end 432 is attached to the first lens 405 and the second end 438 is attached to the second lens 407. The first end 432 of the cross bar 430 has an extension 442 perpendicular to the plane of the cross bar 430. Similarly, the second end 438 of the cross bar 430 has an extension 448 perpendicular to the plane of the cross bar 430. Each of the extensions 442 and 448 has a proximal end 442a, 448a and a distal end 442b, 448b. The proximal end 442a, 448a of the extensions 442, 448 is flush with the exterior side of the respective ends 432, 438 of the crossbar 430. The extensions range from about 0.5 mm to about 2 mm in length. In addition, the extensions 442 and 448 have a magnet or magnetic material that provides magnetic characteristics to the extensions. The extensions 442 and 448 are adapted to receive the female receiving ends 372, 392, respectively, of the clip 350. The female receiving ends 372 and 392 of the clip 350 may include a magnet or magnetic material with a polarity opposite the polarity of the mounting element of the frame 400. Alternatively, the female receiving ends 372, 392 may be comprised of a metallic material that enhances the attraction to the magnet or magnetic material of the associated extension 442, 448. Accordingly, the addition of the extensions 442 and 448 of the frame 400 adjacent to the cross bar 430 with the reciprocating female receiving ends 372 and 392 of the clip 350 enhances the mechanical and magnetic bonding elements to maintain mounting of the clip to the frame in an aligned position.

Figure 9:
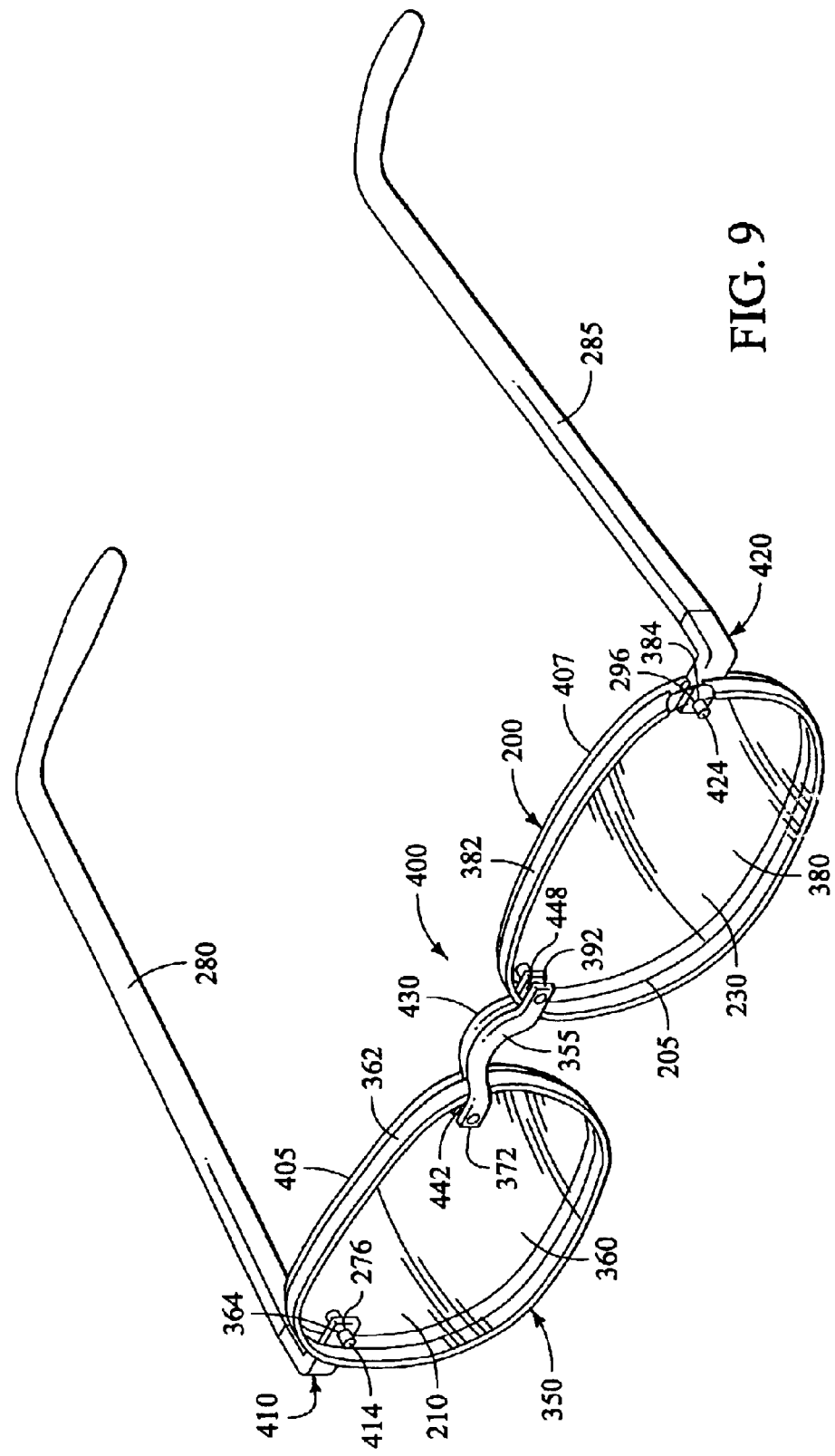
FIG. 9 is an illustration of the alternative configuration of the clip of the second embodiment of the invention bonding to the alternative configuration of the alternative configuration of the second embodiment of the eyeglass frame.

FIG. 9 is an illustration of the clip 350 being mounted to the frame 400. To secure the clip 350 to the eyeglass frame 400, the user must place an interior side of the lenses 360, 380 of the clip 300 adjacent to the exterior side 410 of the lenses 405 and 407 of the frame 400. The cross bar 355 of the clip 350 fits in front of or beneath the cross bar 430 of the frame 400. The extensions 414 and 424 of the frame 400 adjacent to the elbows 410 and 420, respectively, make contact with a reciprocating female receiving element 364 and 384 of the clip 300 when the clip is properly secured to the frame. Similarly, extensions 442 and 448 make contact with reciprocating female receiving elements 372, 392. The magnetic attracting elements of the female receiving elements 364 and 384 of the clip 350 are attracted to the magnets in the extensions 414 and 424 of the frame 400. Similarly, the magnetic attracting elements of the female receiving elements 372 and 392 of the clip 350 are attracted to the magnets in extensions 442 and 448 of the frame 400. To secure the clip 350 to the eyeglass frame 400, the user must place an interior side of the clip 350 adjacent to the exterior side of the lenses of the frame 400. The cross bar 355 of the clip 350 fits in front of or beneath the cross bar 430 of the frame 400. The mounting elements 414 and 424 of the frame 400 adjacent to the elbows 410 and 420 make contact with a reciprocating female receiving element 372 and 392 of the clip 355 and mounting elements 442 and 448 adjacent to the cross bar 430 make contact with reciprocating female receiving elements 372 and 394 or the clip 355 when the clip is properly secured to the frame. Accordingly, the magnetic attraction of the extensions to the female receiving elements in combination with the inherent mechanical properties enhance the ability for the clip to mount to and remain mounted to the frame.

Advantages Over the Prior Art

The first embodiment is a clip that is adapted to be mounted inside the eyeglass frame. The exterior side of the lenses of the clip are placed adjacent to the interior side of the lenses of the frame. The clip actually sits on or in close proximity to the bridge of the nose of the person wearing the frames. If the magnetic attracting elements of the frames and lenses fail, the clip would remain on the bridge of the user, and would not fall off and become lost, as well as maintain its alignment with the eyeglass frame. Accordingly, the placement of the clip inside the frame provides an added element of alignment of the clip to the frame as well as a mechanical holding element for the clip.

The second embodiment is a clip that is adapted to be mounted to the exterior side of a rimless eyeglass frame. The connecting elements of the frame are mounting elements with magnetic properties. The clip includes female receiving elements that are adapted to receive the mounting elements of the frame The female receiving elements may include a magnet, magnetic material, or a magnetic attracting element. The added structure of the mounting elements and female receiving elements provides an enhanced mechanical stabilizing element to the physical structure of the assembly. The clips are held onto the frame by both magnetic attraction as well as mechanical force. Accordingly, there are two physical properties that bond and hold the clip in an aligned position relative to the frame.

Alternative Embodiments

It will be appreciated that, although specific embodiments of the invention have been described herein for purposes of illustration, various modifications may be made without departing from the spirit and scope of the invention. In particular, the magnets of both embodiments of the invention may be a physical magnet or a magnetic material. Similarly, the attracting element in the reciprocating frame or clip may be a metal with properties that enable the attraction of the clip to the frame. Accordingly, the scope of protection of this invention is limited only by the following claims and their equivalents.

I claim:

1. An eyewear assembly comprising:

a pair of eyeglasses having a first lens and a second lens with a rim adapted to extend around a perimeter of each lens, and each lens and associated rim having an interior side and an exterior side, wherein said interior side is adapted to be placed adjacent to a user of said eyeglasses;

a cross bar mounted between said perimeters of said lenses;

an elbow mounted to an exterior side of said rims extending from said rim to a leg mounted perpendicular to said elbow;

said elbow is adapted to extend from an exterior side of said rim to said leg;

a portion of said elbow adjacent to said interior side of said lenses and parallel to said crossbar includes an aperture adapted to receive a first magnetic element;

a pair of auxiliary eyeglasses having a first lens and a second lens with a rim adapted to extend around a perimeter of each lens and each lens and associated rim having an interior side and an exterior side;

a cross bar mounted between said perimeters of said lenses of said auxiliary eyeglasses, wherein said cross bar is adapted to hold said lenses in a spaced apart relationship;

an extension adjacent to said auxiliary eyeglass lens perimeter, wherein said extension is parallel to said cross bar;

said extension includes an aperture adapted to a second magnetic element;

wherein said first magnetic element is adapted to bond to said second magnetic element, with said interior side of said auxiliary eyeglasses adapted to be placed adjacent to a user of said auxiliary eyeglasses.

2. The eyewear of claim 1, wherein said first magnetic element of said eyeglasses and said second magnetic element of said auxiliary eyeglasses are oppositely polarized.

3. The eyewear of claim 1, wherein an interior side of said eyeglass lens is adapted to receive an adjacently mounted exterior side of said auxiliary lens.

4. The eyewear of claim 3, wherein an exterior side of said auxiliary eyeglasses is adapted to be mounted adjacent to an interior of said eyeglass lens.

5. The eyewear of claim 1, wherein said first and said second magnetic elements are selected from the group consisting of: a magnet, a magnetic material, a metallic magnetic attracting element, and combinations thereof.

6. The eyewear of claim 1, wherein said cross bar of said auxiliary eyeglasses is adapted to be parallel to said cross bar of said eyeglasses when said eyeglasses and said auxiliary eyeglasses are magnetically mounted.

7. An eyewear assembly comprising:

a pair of eyeglasses having a first lens and a second lens with a rim adapted to extend around a perimeter of each lens and each lens and associated rim having an interior side and an exterior side, wherein said interior side is adapted to be placed adjacent to a user of said eyeglasses;

a first pair of magnetic attracting elements mounted on an interior side of said eyeglasses;

a pair of auxiliary eyeglasses having a first lens and a second lens with a rim adapted to extend around a perimeter of each lens, and each lens and associated rim having an interior side and an exterior side;

a second a pair of magnetic attracting elements mounted to an exterior side of said auxiliary eyeglasses;

wherein said first magnetic attracting elements of said eyeglasses is adapted to bond to said second magnetic attracting elements of said auxiliary eyeglasses, and said exterior side of said auxiliary eyeglass lenses is adapted to be placed adjacent to an interior side of said eyeglasses.

8. The eyewear assembly of claim 7, wherein said first and said second magnetic elements are selected from the group consisting of a magnet, a magnetic material, a metallic magnetic attracting element, and combinations thereof.

9. The eyewear assembly of claim 7, wherein said first magnetic attracting element and said second magnetic attracting element are oppositely polarized.

10. The eyewear assembly of claims 7, wherein said first magnetic attracting elements are adjacent to an interior side of said eyeglasses.

11. The eyewear assembly of claim 7, wherein said second magnetic attracting element is adjacent to said rim of said auxiliary eyeglasses.

* * * * *